United States Patent [19]
Ulrich

[11] Patent Number: 5,978,132
[45] Date of Patent: Nov. 2, 1999

[54] ACHROMATIZED AND ATHERMALIZED TWO-LENS REIMAGER

[75] Inventor: Wilhelm Ulrich, Aalen, Germany

[73] Assignee: Carl-Zeiss-Stiftung, Heidenheim, Germany

[21] Appl. No.: 08/949,456

[22] Filed: Oct. 14, 1997

[30] Foreign Application Priority Data

Oct. 12, 1996 [DE] Germany .......................... 196 42 121

[51] Int. Cl.⁶ .................................................. G02B 13/14
[52] U.S. Cl. ...................... 359/355; 359/356; 359/362; 359/793; 359/794
[58] Field of Search ................................ 359/565, 355, 359/356, 362, 793, 794

[56] References Cited

U.S. PATENT DOCUMENTS

| | | | |
|---|---|---|---|
| 5,044,706 | 9/1991 | Chen | 359/357 |
| 5,202,792 | 4/1993 | Rollin | 359/356 |
| 5,257,133 | 10/1993 | Chen | 359/565 |
| 5,504,628 | 4/1996 | Borchard | 359/796 |
| 5,691,847 | 11/1997 | Chen | 359/565 |

Primary Examiner—Cassandra Spyrou
Assistant Examiner—Craig Curtis
Attorney, Agent, or Firm—Walter Ottesen

[57] ABSTRACT

A reimager comprises precisely two positive lenses wherein the chromatic longitudinal aberration lies within the depth of focus and the thermal image position variation likewise lies within the depth of focus over a temperature range of more than ±30° (in the embodiment from −40° C. to +70° C.). Aspheric and diffractive surfaces are utilized and, if required, are joined on respective lens surfaces (31, 51, 53, 71, 73).

14 Claims, 10 Drawing Sheets

FIG. 8

ACHROMATIZED AND ATHERMALIZED TWO-LENS REIMAGER

FIELD OF THE INVENTION

The invention relates to a reimager. More specifically, the invention relates to an optical system wherein an object lying at infinity is imaged via an intermediate image into an image plane. For this purpose, two converging lenses are, in principle, a minimum. Such simple systems having purely spherical lenses are, however, not suitable as an optic of an infrared image recording measuring system.

BACKGROUND OF THE INVENTION

A solution having suitable chromatic and thermal correction for thermal image apparatus in the spectral range from approximately 7.5 μm to 10.5 μm and only four to five lenses is disclosed in United States patent application 08/780,295, filed Jan. 8, 1997, incorporated herein by reference. Here, chalcogenide glasses and aspheric surfaces are provided.

U.S. Pat. No. 5,044,706 discloses a telescope suitable for the same use. An intermediate image is provided with four lenses for the far viewing field. Thus, a reimager is provided. A telescope without an intermediate image is realized with only two lenses thereof. The front lenses both have aspheric surfaces on different sides and a diffractive kinoform surface. Nothing is suggested as to athermalization.

SUMMARY OF THE INVENTION

It is an object of the invention to provide a reimager which offers achromatism and athermalization as well as an image quality as is required for thermal image apparatus. It is a further object of the invention to provide such a reimager which has a minimum number of optical elements.

The reimager of the invention includes: precisely two positive lenses conjointly defining an optical axis and a depth of focus; and, the positive lenses being configured so that the reimager has a chromatic longitudinal aberration within the depth of focus and has a thermal image position variation which is within the depth of focus over a temperature range of greater than ±30° C.

According to another embodiment of the invention, the reimager includes: two lenses conjointly defining an optical axis; and, each one of the lenses having only one surface made to have at least one of an aspheric configuration and a diffractive configuration.

It has been found that the necessary number of two lenses is also adequate for a reimager which can be utilized. As a supplement to aspherical surfaces (one per lens), diffractive surfaces can be used which are preferably superposed onto the aspheric surfaces as fine structures. Accordingly, only one surface per element has to be specially treated and can, for example, be machined by fine turning. The selection of material is also significant and chalcogenide glasses and zinc sulfide are advantageous. Both lenses are preferably made of the same material.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
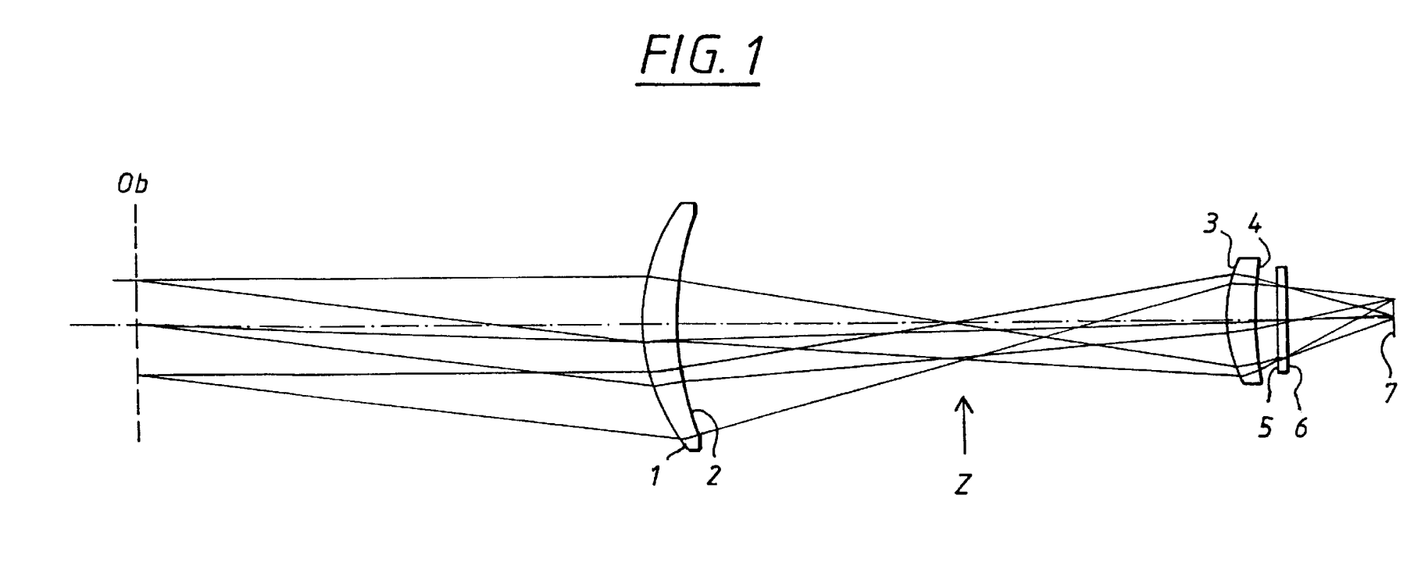
FIG. 1 is a lens section view of a first embodiment of the reimager of the invention without diffractive elements.

The reimager of FIG. 1 has lens surfaces 1, 2, 3 and 4 and the image plane 7. The construction data of Table 1 apply to the reimager of FIG. 1. The surfaces 5 and 6 delimit a planar plate made of germanium as is provided as the termination for conventional cooled infrared detectors. The planar plate is therefore to be taken into account for the optical construction. The two lenses having the surfaces (1, 2) and (3, 4) are made of chalcogenide glass IG6 available from Vitron Spezialwerkstoffe GmbH, Jena.

The two forward surfaces (1, 3) are configured as aspheric surfaces. A rotationally-symmetrical aspheric deformation is superposed on one spherical surface having the radius R. This deformation is given as the sagittal difference pD of the aspherical surface to the spherical surface and is a function of the distance (h) from the optical axis. The conic section basic form is a parabola in all embodiments so that the following formula results having aspherical constants $c_1$ to $c_n$:

$$pD(h) = (\tfrac{1}{2}R)h^2 + c_1 h^4 + \ldots + c_n h^{2n+2}.$$

The reimager of FIG. 1 and Table 1 is adapted to the requirements in a thermal image apparatus. The entry pupil lies forward of the system so that the conventional scanner can be mounted there. The exit pupil lies 8.000 mm forward of the image plane at the location of the aperture diaphragm which is conventional as a thermal shield for the cooled detectors.

The reimager is achrathermal for a spectral bandwidth of 7.5 μm to 10.5 μm with the center wavelength 9.0 μm and the temperature range from −40° C. to +70° C. With the reimager being achrathermal, this means that the chromatic longitudinal aberration CHL and the thermal image position variation Δs' lie within the diffraction limited focal range of the reimager.

More specifically:

CHL (7.5 μm)=−60 μm

CHL (10.5 μm)=+65 μm

Δs'(ΔT=+50°)=−39 μm with aluminum frame

Δs'(ΔT=+50°)=−17 μm with titanium frame.

The transverse chromatic aberration (CHV) is:

CHV (7.5 μm)=−0.18%

CHV (10.5 μm)=+0.20% in percent of the image height and the thermal focal length variation is:

Δf'(ΔT=+50° C.)/f'(20°)=−0.44% with aluminum frame

Δf'(ΔT=+50° C.)/f'(20°)=−0.22% with titanium frame.

The limiting error is the chromatic longitudinal aberration CHL.

Figure 2:
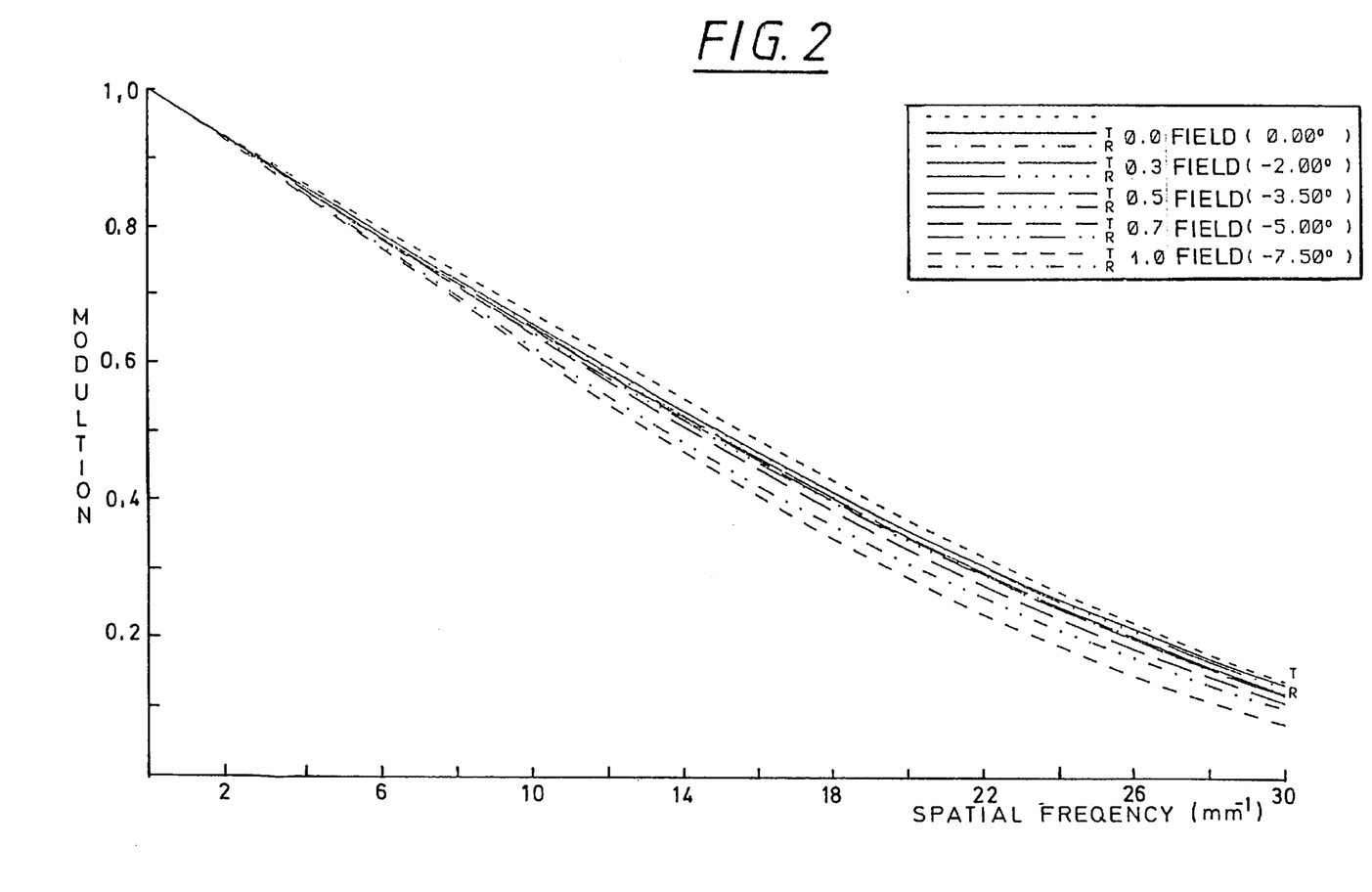
FIG. 2 is a graph showing the diffraction modulation transfer function for different image heights.

FIG. 2 shows the modulation transfer function MTF for the stop number K=3.0 with a balancing of all wavelengths from 7.5 μm to 10.5 μm for tangential direction T and radial direction R and for ray heights of 0.0; 0.5; 0.7; and 1 multiplied by the field radius F. Here, an excellent correction result is obtained. However, for the full opening of K=1.5, there is a significant MTF loss.

Figure 3:
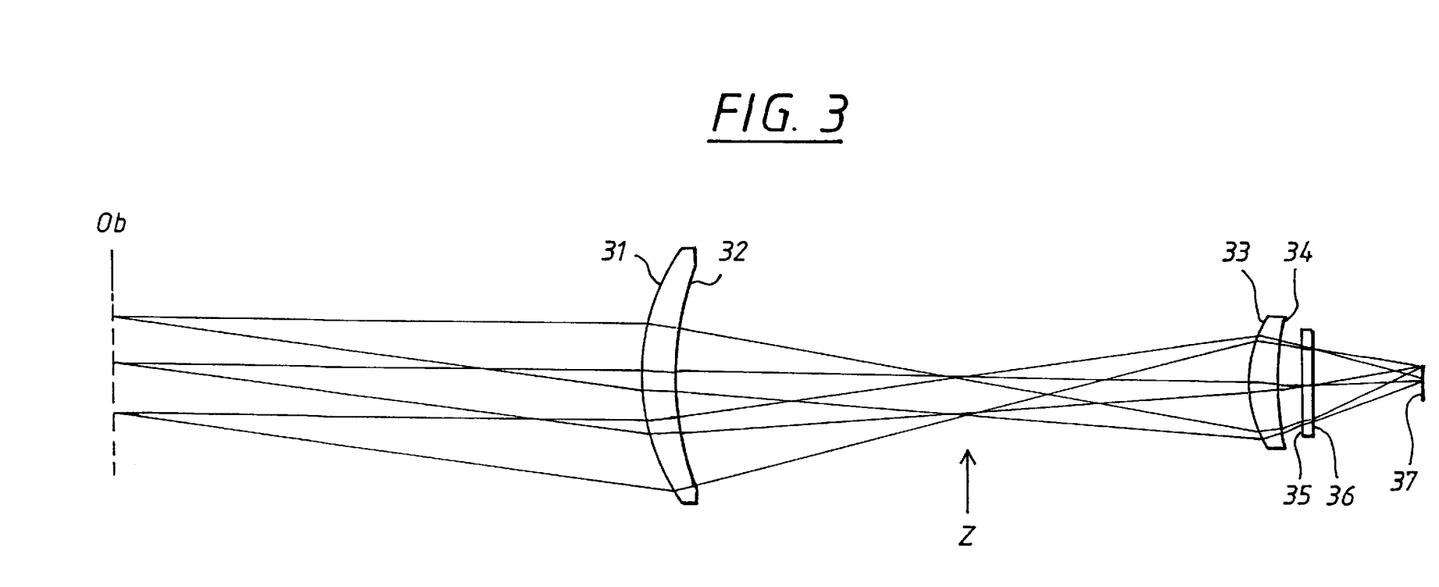
FIG. 3 is a lens section view of a second embodiment of the reimager of the invention with a diffractive element.

The embodiment of FIG. 3 and Table 2 is assembled for the same mounting conditions. The lens surfaces 32 and 34 on the respective rearward sides of the respective lenses are spherical. The respective forward surfaces 31 and 33 are aspherical. The surface 33 is configured with concentric rings as diffractive optical element (DOE). When a rotational-symmetrical phase function is superposed on a spherical or aspherical surface, then this deformation can be defined as described below.

The superposed groove profile is a function of the distance (h) from the optical axis and repeats periodically to the maximum groove depth T.

The diffractive difference pD(h) is computed for the embodiments as follows:

pD(h)=T·(N(h)−integer N(h), having the maximum groove depth: T=WL/(n−1)

and the number of grooves: N(h)=$D_1$ (h2)/WL.

This means:

WL=blaze wavelength: here WL=9 μm n=refractive index of the lens $D_1$=diffractive constant.

For the above, the constants in Table 2 apply.

In contrast to the embodiment of FIG. 1, the chromatic longitudinal aberration CHL is improved, however, with increased transverse deviation CHV as can be seen from the following numerical values:

CHL (7.5 μm)=−8 μm

CHL (0.5 μm)=+13 μm

Δs'(ΔT=+50°)=−39 μm with aluminum frame

Δs'(ΔT=+50°)=−17 μm with titanium frame

CHV (7.5 μm)=−0.42%

CHV (10.5 μm)=+0.44%

Δf'(ΔT=+50° C.)/f20°=−0.44% with aluminum frame

Δf'(ΔT=+50° C.)/f20°=−0.22% with titanium frame.

Figure 4A:
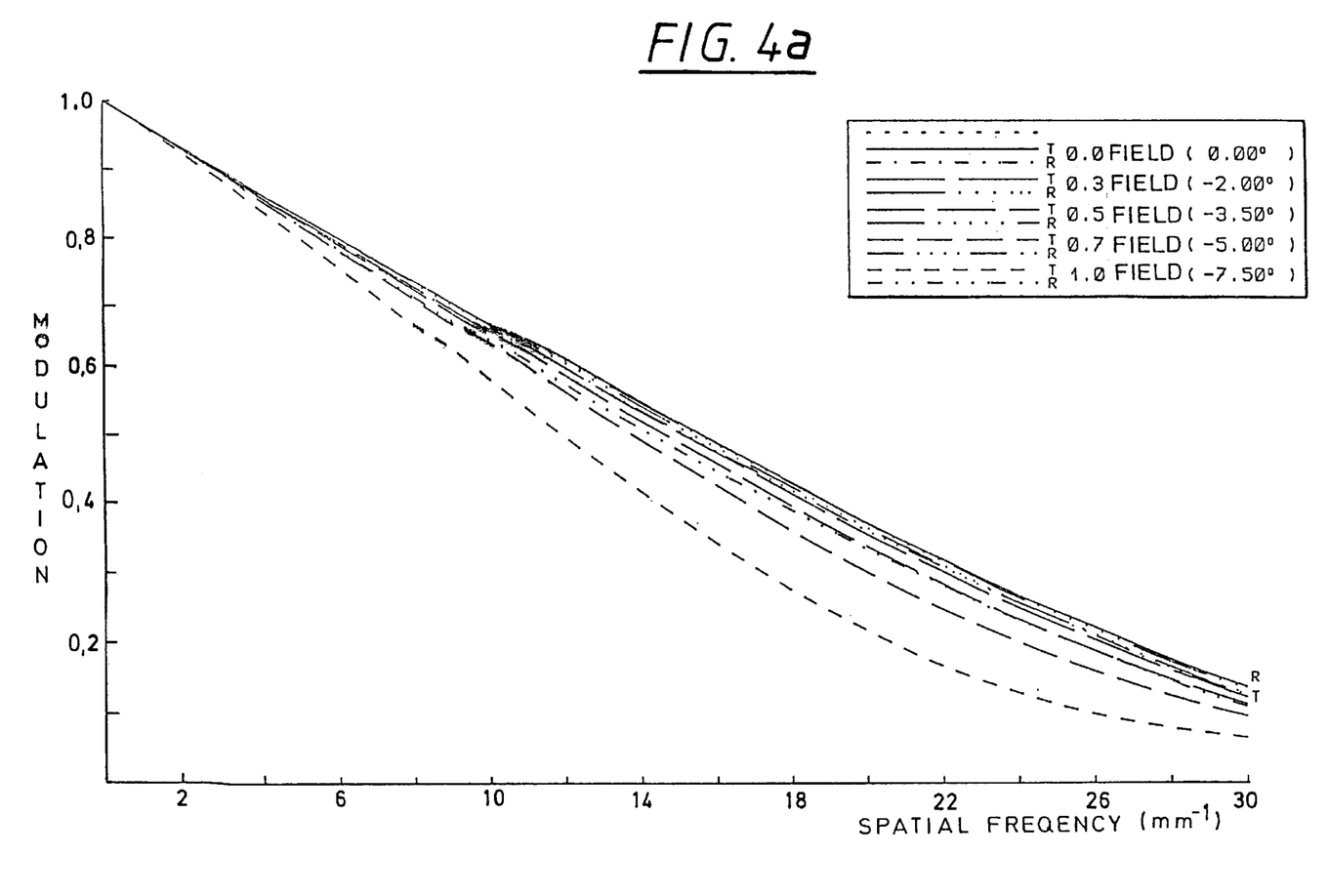
FIG. 4a is a graph showing the diffraction modulation transfer function for the reimager of FIG. 3 for different image heights wherein K=3.0.
Figure 4B:
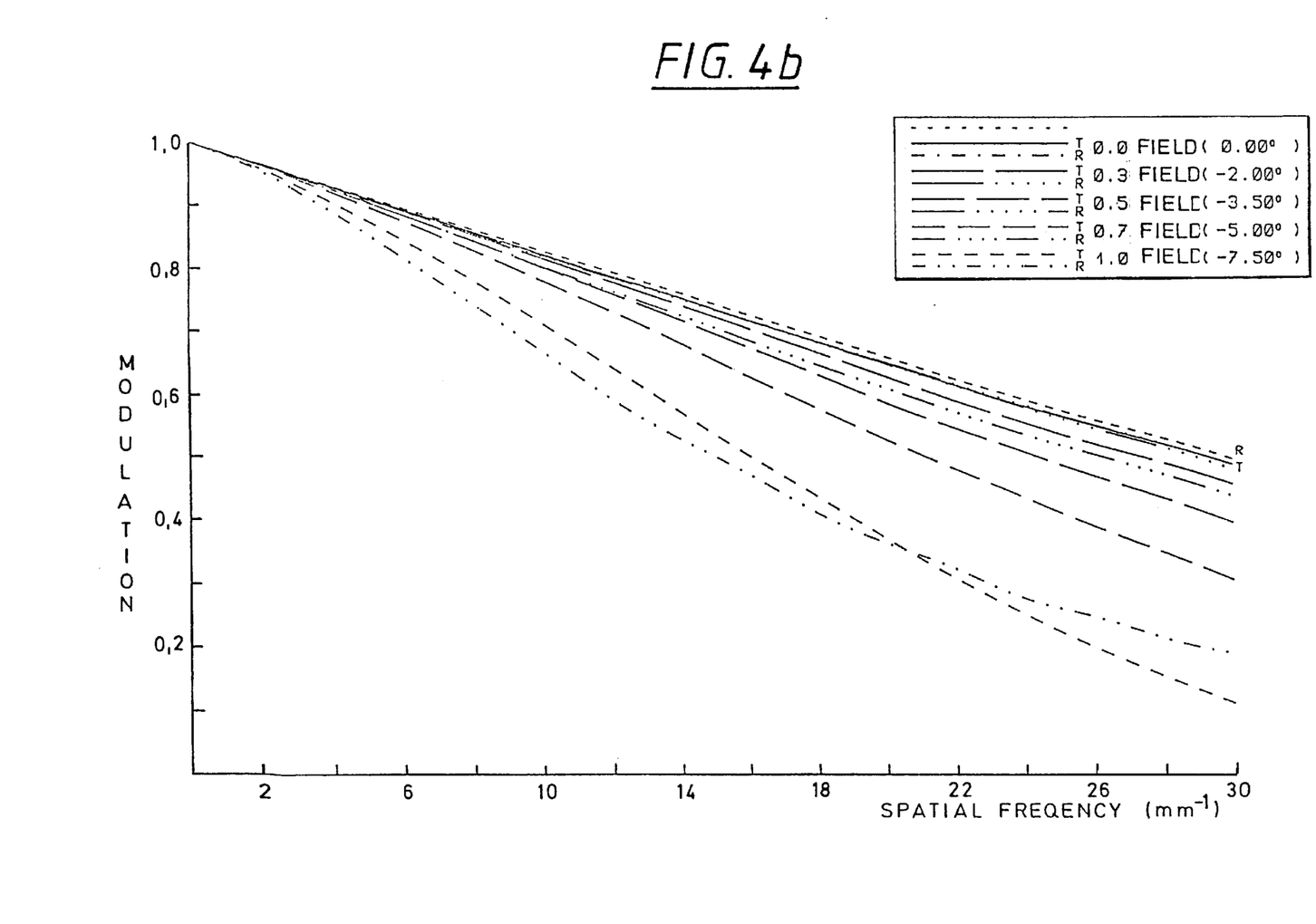
FIG. 4b is a graph showing the diffraction modulation transfer function for the reimager of FIG. 3 for different image heights wherein K=1.5.

FIG. 4a presents the modulation transfer function for the above at K=3.0 and FIG. 4b shows the modulation transfer function at K=1.5.

Figure 5:
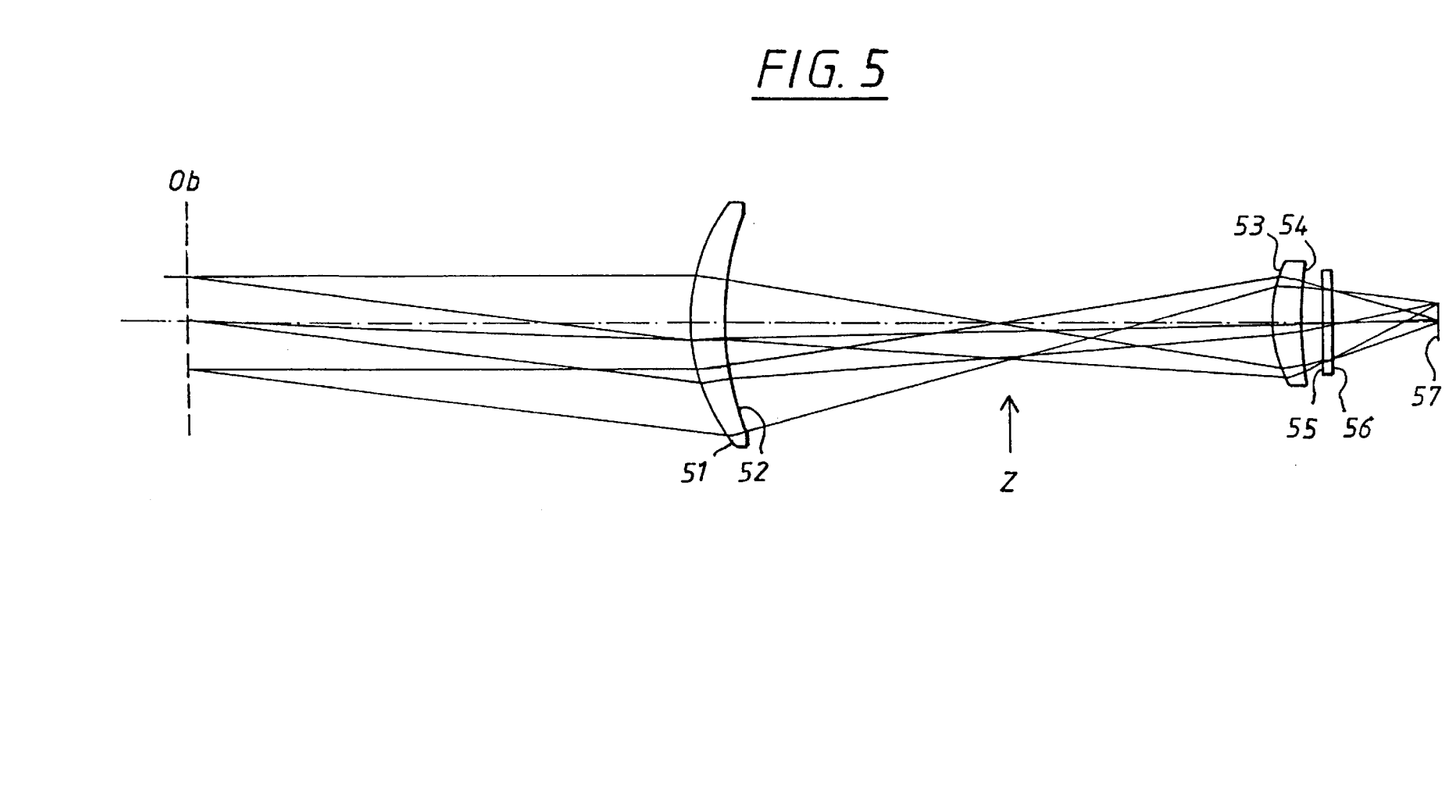
FIG. 5 is a lens section view of a third embodiment of the reimager of the invention with two diffractive elements.
Figure 6A:
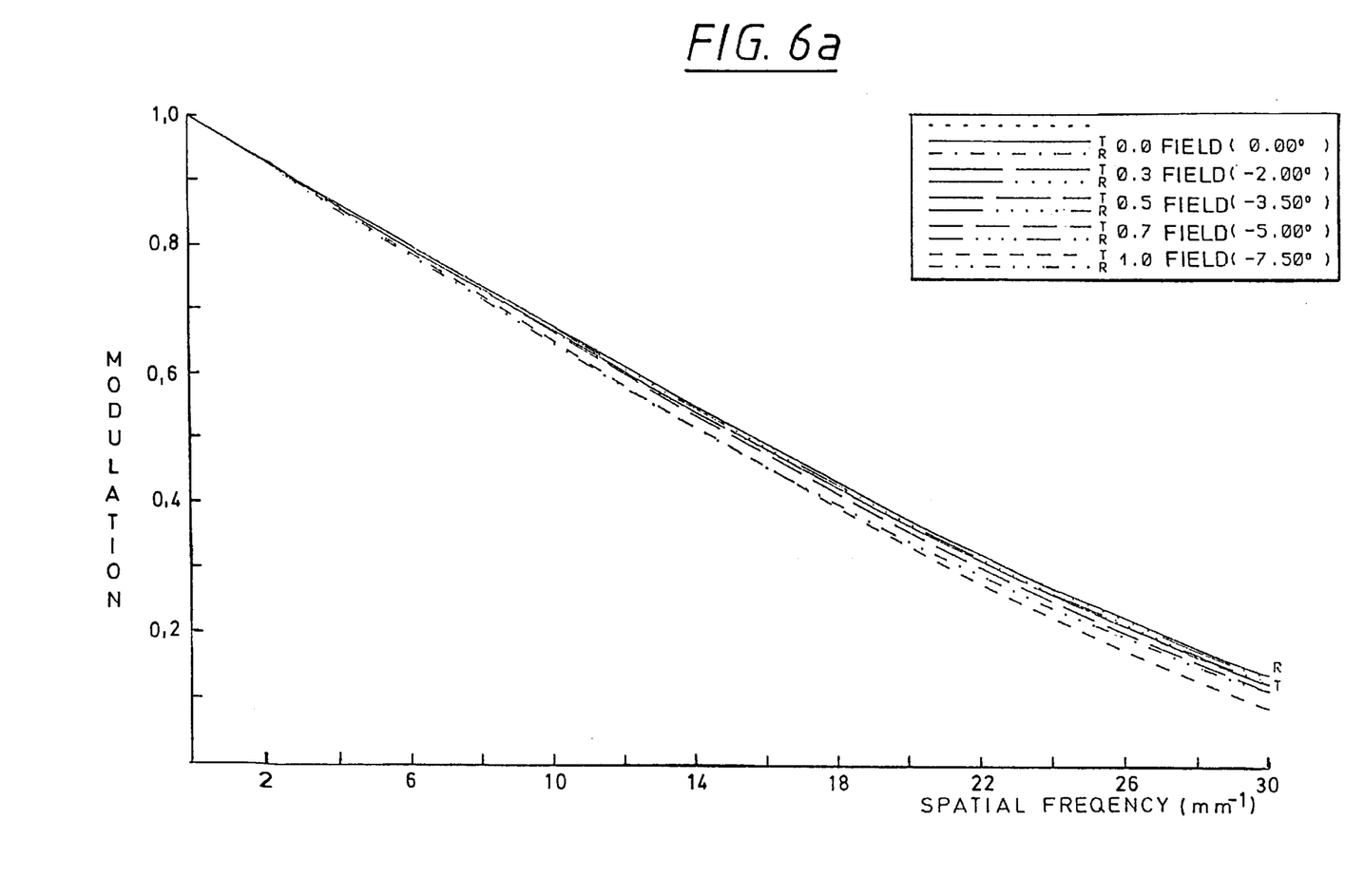
FIG. 6a is a graph showing the diffraction modulation transfer function for the reimager of FIG. 5 for different image heights wherein K=3.0.
Figure 6B:
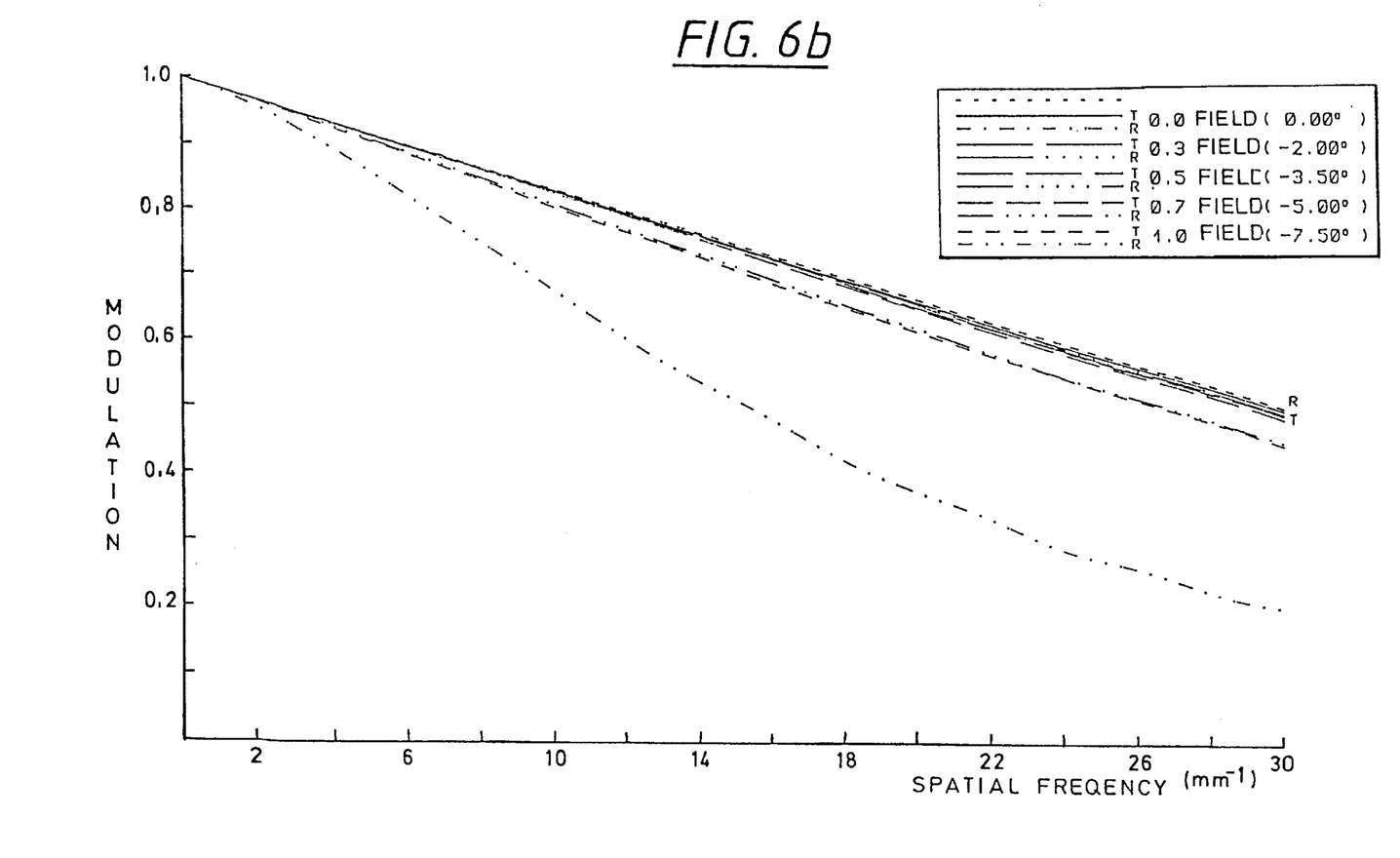
FIG. 6b is a graph of the diffraction modulation transfer function for the reimager of FIG. 5 for different image heights wherein K=1.5.

FIG. 5 and Table 3 as well as the modulation transfer functions shown in FIGS. 6a and 6b correspond to the third embodiment having two aspherical surfaces 51 and 53. Both of these aspherical surfaces are superposed with a diffractive structure. The rear surfaces 52 and 54 are again spherical and the glass is type IG6 as in the previous embodiments. Also, a germanium planar plate (55, 56) is provided. The following chromatic and thermal residual errors result in the object plane 57:

CHL (7.5 μm)=+3 μm

CHL (10.5 μm)=+2 μm

Δs'(ΔT=+50°)=−39 μm with aluminum frame

Δs'(ΔT=+50°)=−17 μm with titanium frame

CHV (7.5 μm)=0.0%

CHV (10.5 μm)=0.0%

Δf'(ΔT=+50° C.)/f'(20°)=−0.44% with aluminum frame

Δf'(ΔT=+50° C.)/f'(20°)=−0.22% with titanium frame.

Because of the second diffractive surface 51, the CHV is now also excellent and the best achromatic condition is achieved. The modulation transfer function curves show diffraction-limited correction up to almost into the image corners. FIG. 6a shows the modulation transfer function for K=3.0 and FIG. 6b for K=1.5.

Figure 7:
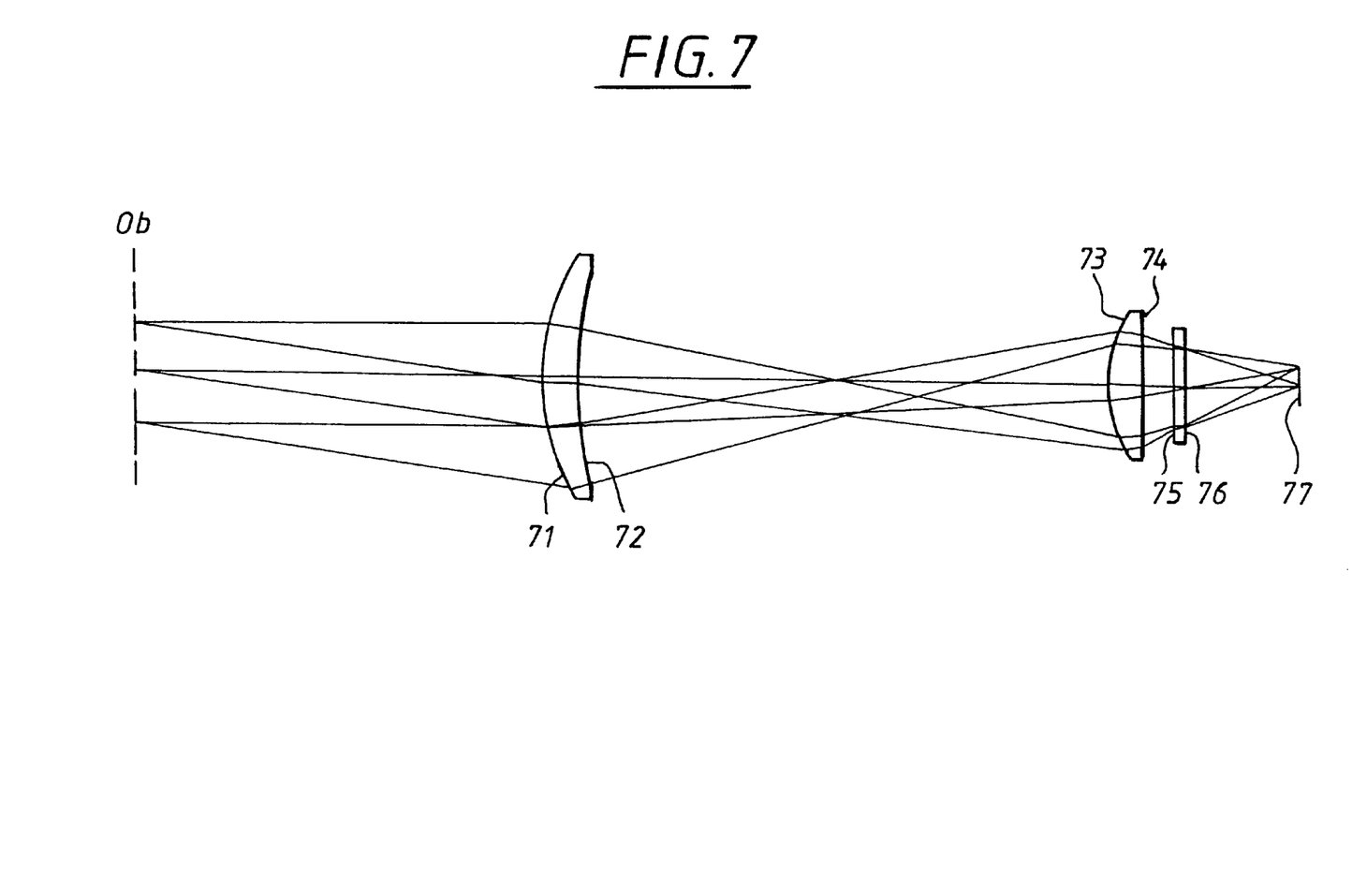
FIG. 7 is a lens section view of a fourth embodiment of the reimager of the invention with two diffractive elements; and, FIG. 8 is a graph showing the diffraction modulation transfer function for the reimager of FIG. 7 for different image heights.

A further embodiment does not use the chalcogenide glass IG6 and utilizes the more available material ZnS for the lenses 71/72 and 73/74. This further embodiment is shown in FIG. 7 and the data therefor are presented in Table 4. Here again, the front surfaces (71, 73) are configured to be aspherical and diffractive.

This solution is however not as well athermalized as the embodiments utilizing chalcogenide glass IG6. However, the quality is adequate from the value K=2.5 and upward. Thus:

CHL (7.5 μm)=+40 μm

CHL (10.5 μm)=+52 μm s'(ΔT=+50°)=−79 μm with aluminum frame s'(ΔT=+50°)=−55 μm with titanium frame CHV (7.5 μm)=+0.04%

CHV (10.5 μm)=+0.10%

Δf'(ΔT=+50° C./f(20°)=−0.90% with aluminum frame

Δf'(ΔT=+50° C./f(20°)=−0.67% with titanium frame.

Figure 8:
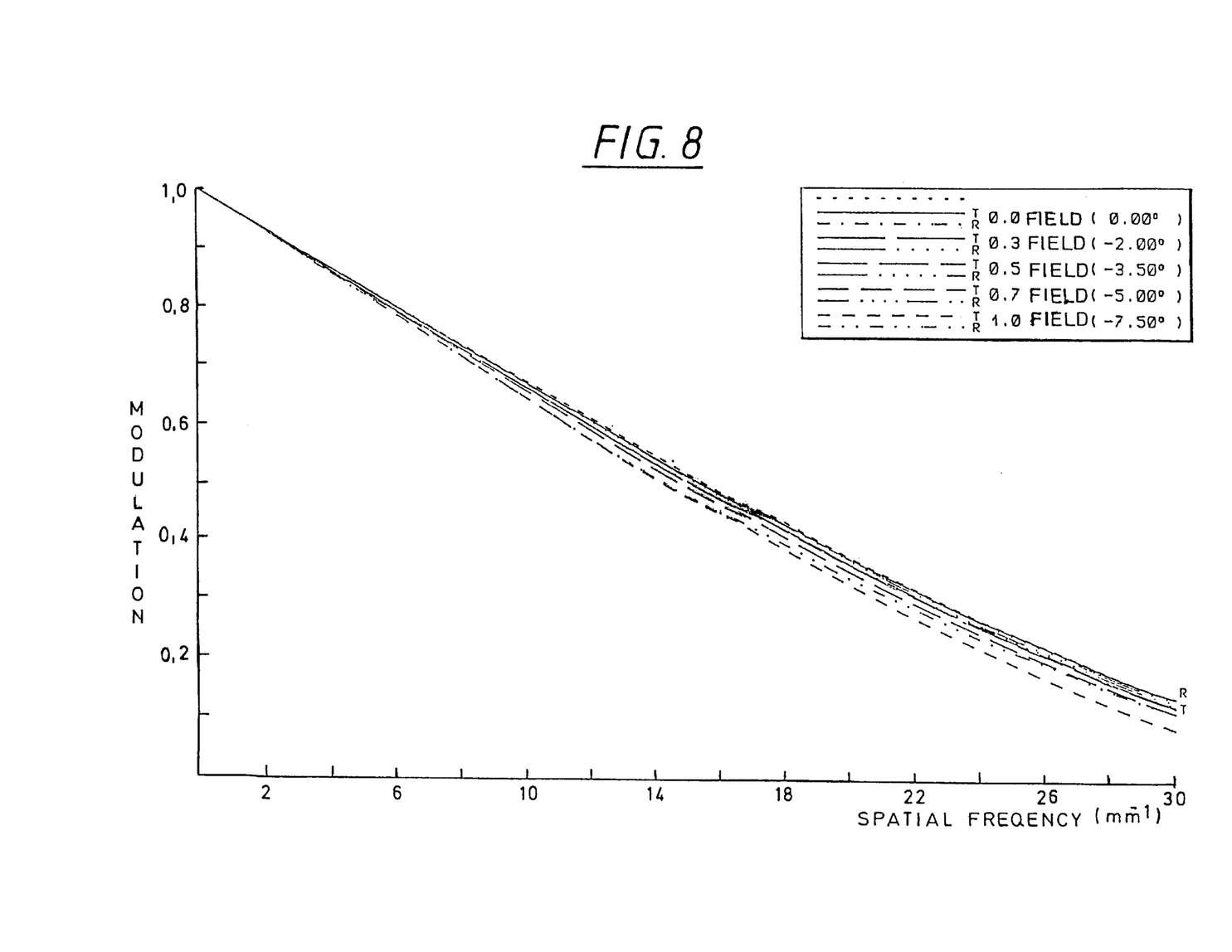

The modulation transfer function curve of FIG. 8 shows the diffraction-limited correction at K=3.0.

It has been therefore shown that the achrathermal reimager with only two lenses according to the invention is usable in many embodiments.

It is understood that the foregoing description is that of the preferred embodiments of the invention and that various changes and modifications may be made thereto without departing from the spirit and scope of the invention as defined in the appended claims.

TABLE 1

(FIG. 1)

| | Radius R (mm) | Thickness (mm) | Glass |
|---|---|---|---|
| | Object | 53.858 | |
| 1 | 22.627 | 3.250 | IG6 |
| Asphere: | $c_1 = 0.57143 \cdot 10^{-5}$ | $c_2 = 0.57601 \cdot 10^{-8}$ | |
| 2 | 36.088 | 26.796 | |
| | Intermediate Image | 29.146 | |
| 3 | 13.228 | 2.900 | IG6 |
| Asphere: | $c_1 = 0.43329 \cdot 10^{-5}$ | $c_2 = 0.25826 \cdot 10^{-6}$ | |
| | $c_3 = -0.37092 \cdot 10^{-8}$ | | |
| 4 | 48.5297 | 2.300 | |
| 5 | | 1.000 | Ge |
| 6 | | 10.750 | |
| 7 | Image | | |

TABLE 2

(FIG. 3)

| | Radius R (mm) | Thickness (mm) | Glass |
|---|---|---|---|
| | Object | 53.500 | |
| 31 | 22.882 | 3.250 | IG6 |
| Asphere: | $c_1 = 0.5461 \cdot 10^{-5}$ | $c_2 = 0.5228 \cdot 10^{-8}$ | |
| 32 | 36.921 | 26.758 | |

TABLE 2-continued (FIG. 3)

| | Radius R (mm) | Thickness (mm) | Glass |
|---|---|---|---|
| Intermediate Image Plane Z | | 29.407 | |
| 33 | 13.403 | 2.900 | IG6 |
| Asphere: | $c_1 = 8.7681 \cdot 10^{-6}$ | $c_2 = 7.1551 \cdot 10^{-8}$ | |
| | $c_3 = -8.2006 \cdot 10^{-10}$ | | |
| | $D_1 = -0.7128 \cdot 10^{-3}$ | $T = 5.06 \mu m$ | |
| 34 | 47.453 | 2.434 | |
| 35 | ∞ | 1.000 | Ge |
| 36 | ∞ | 10.750 | |
| 37 | Image | | |

TABLE 3

(FIG. 5)

| | Radius R (mm) | Thickness (mm) | Glass |
|---|---|---|---|
| | Object | 53.500 | |
| 51 | 21.872 | 3.250 | IG6 |
| Asphere: | $c_1 = 0.6536 \cdot 10^{-5}$ | $c_2 = 0.6825 \cdot 10^{-8}$ | |
| | $D_1 = -0.2260 \cdot 10^{-3}$ | $T = 5.06 \mu m$ | |
| 52 | 34.097 | 26.113 | |
| Intermediate Image Plane Z | | 29.643 | |
| 53 | 13.676 | 2.900 | IG6 |
| Asphere: | $c_1 = 0.8233 \cdot 10^{-5}$ | $c_2 = 0.5213 \cdot 10^{-7}$ | |
| | $c_3 = -0.5358 \cdot 10^{-9}$ | | |
| | $D_1 = -0.6181 \cdot 10^{-3}$ | $T = 5.06 \mu m$ | |
| 54 | 48.738 | 2.844 | |
| 55 | ∞ | 1.000 | Ge |
| 56 | ∞ | 10.750 | |
| 57 | Image | | |

TABLE 4

(FIG. 7)

| | Radius R (mm) | Thickness (mm) | Glass |
|---|---|---|---|
| | Object | 58.828 | |
| 71 | 21.222 | 3.250 | ZnS |
| Asphere: | $c_1 = 0.3515 \cdot 10^{-5}$ | $c_2 = 0.1232 \cdot 10^{-7}$ | |
| | $c_3 = -0.3178 \cdot 10^{-10}$ | | |
| | $D_1 = -0.1486 \cdot 10^{-2}$ | $T = 7.42 \mu m$ | |
| 72 | 52.005 | 23.476 | |
| Intermediate Image Plane Z | | 26.608 | |
| 73 | 12.589 | 2.900 | ZnS |
| Asphere: | $c_1 = -0.1543 \cdot 10^{-4}$ | $c_2 = 0.1617 \cdot 10^{-7}$ | |
| | $c_3 = -0.6583 \cdot 10^{-9}$ | | |
| | $D_1 = -0.3774 \cdot 10^{-2}$ | $T = 7.42 \mu m$ | |
| 74 | 608.750 | 3.188 | |
| 75 | ∞ | 1.000 | Ge |
| 76 | ∞ | 10.750 | |
| 77 | Image | | |

What is claimed is:

1. A reimager comprising:

precisely two positive lenses conjointly defining an optical axis and a depth of focus;

said two positive lenses further defining an intermediate image plane between said two positive lenses wherein an intermediate image of an object at infinity is generated by a first one of said two positive lenses and wherein said intermediate image is further imaged into an image plane by the second one of said two positive lenses; and, said positive lenses being configured so that said reimager has a chromatic longitudinal aberration within said depth of focus and has a thermal image position variation which is smaller than said depth of focus for temperature variations within a range of at least +30° about an intermediate temperature value.

2. The reimager of claim 1, wherein said temperature range is greater than +50° C. about said intermediate temperature value.

3. The reimager of claim 1, wherein one of said lenses is made of chalcogenide glass.

4. The reimager of claim 1, wherein one of said lenses is made of zinc sulfide.

5. The reimager of claim 1, wherein both of said lenses are made of the same material.

6. The reimager of claim 1, wherein said two lenses are devoid of diffractive surfaces.

7. The reimager of claim 1, wherein precisely one of said lenses has a diffractive surface.

8. The reimager of claim 7, wherein the diffractive surface is superposed on an aspherical surface.

9. The reimager of claim 1, comprising two diffractive surfaces.

10. The reimager of claim 8, wherein each of said diffractive surfaces is superposed on an aspherical surface.

11. The reimager of claim 1, wherein one of said lenses has a surface which has a diffractive structure rotationally symmetrical to said optical axis.

12. The reimager of claim 11, wherein said diffractive structure is of the kinoform type.

13. The reimager of claim 1, wherein said lenses comprise forward surfaces, which are configured as aspheric surfaces.

14. The reimager of claim 1, wherein said lenses comprise forward surfaces, which are configured as spheric surfaces.

* * * * *

UNITED STATES PATENT AND TRADEMARK OFFICE
CERTIFICATE OF CORRECTION

PATENT NO. : 5,978,132
DATED : November 2, 1999
INVENTOR(S) : Wilhelm Ulrich

It is certified that error appears in the above-identified patent and that said Letters Patent is hereby corrected as shown below:

Column 3,
Line 32, delete "$N(h) = D_1 (h2) /WL.$" and substitute -- $N(h) = D_1 (h^2) /WL.$ -- therefor.

Column 6,
Line 20, delete "$+30º$" and substitute -- $\pm 30º$ C. -- therefor.
Line 24, delete "$+50º$ C." and substitute -- $\pm 50º$ C. -- therefor.

Signed and Sealed this

Fifth Day of August, 2003

JAMES E. ROGAN
*Director of the United States Patent and Trademark Office*